(12) United States Patent
Schulze et al.

(10) Patent No.: US 7,403,832 B2
(45) Date of Patent: Jul. 22, 2008

(54) METHOD AND SYSTEM FOR ADVANCED PROCESS CONTROL INCLUDING TOOL DEPENDENT MACHINE CONSTANTS

(75) Inventors: Uwe Schulze, Dresden (DE); Uwe Knappe, Niemtsch (DE)

(73) Assignee: Advanced Micro Devices, Inc., Austin, TX (US)

( * ) Notice: Subject to any disclaimer, the term of this patent is extended or adjusted under 35 U.S.C. 154(b) by 3 days.

(21) Appl. No.: 11/379,092

(22) Filed: Apr. 18, 2006

(65) Prior Publication Data

US 2006/0271225 A1    Nov. 30, 2006

(30) Foreign Application Priority Data

May 31, 2005    (DE) .................. 10 2005 024 915

(51) Int. Cl.
*G06F 19/00*    (2006.01)

(52) U.S. Cl. .................. 700/110; 700/108; 700/109; 700/121; 700/44; 438/5; 438/14; 216/67

(58) Field of Classification Search .................. 700/121, 700/123, 44, 37, 108, 109, 110; 438/5, 14; 216/67

See application file for complete search history.

(56) References Cited

U.S. PATENT DOCUMENTS

| | | | |
|---|---|---|---|
| 6,427,093 B1 * | 7/2002 | Toprac ........................ | 700/121 |
| 6,535,774 B1 * | 3/2003 | Bode et al. .................. | 700/109 |
| 6,738,722 B2 * | 5/2004 | Polla et al. .................. | 702/104 |
| 7,200,455 B2 * | 4/2007 | Schulze ....................... | 700/109 |
| 2003/0078684 A1 * | 4/2003 | Martin et al. ................. | 700/44 |

FOREIGN PATENT DOCUMENTS

EP    1 317 694 B1    4/2004

* cited by examiner

*Primary Examiner*—Michael D Masinick
(74) *Attorney, Agent, or Firm*—Williams, Morgan & Amerson, P.C.

(57) ABSTRACT

A controller and a method of controlling a process tool is provided, in which machine constants used for calibrating manipulated variables of the control algorithm are explicitly introduced into the process model, thereby providing an enhanced controller behavior immediately after the introduction of new measurement values of the machine constants.

19 Claims, 3 Drawing Sheets

METHOD AND SYSTEM FOR ADVANCED PROCESS CONTROL INCLUDING TOOL DEPENDENT MACHINE CONSTANTS

BACKGROUND OF THE INVENTION

1. Field of the Invention

The present invention relates to the field of fabricating semiconductor devices, and, in particular, to advanced process control (APC) techniques for manufacturing processes, wherein an improved process control quality is achieved by adjusting process parameters in a predictive manner on the basis of a process model and measurement data.

2. Description of the Related Art

Today's global market forces manufacturers of mass products to offer high quality products at a low price. It is thus important to improve yield and process efficiency to minimize production costs. This holds especially true in the field of semiconductor fabrication, since here it is essential to combine cutting edge technology with mass production techniques. It is, therefore, the goal of semiconductor manufacturers to reduce the consumption of raw materials and consumables while at the same time improve product quality and process tool utilization. The latter aspect is especially important, since in modern semiconductor facilities, equipment is required which is extremely cost-intensive and represents the dominant part of the total product costs. For example, in manufacturing modern integrated circuits, 500 or more individual processes may be necessary to complete the integrated circuit, wherein failure in a single process step may result in a loss of the complete integrated circuit. This problem is even exacerbated in that the size of substrates, on which a plurality of such integrated circuits are processed, steadily increases, so that failure in a single process step may entail the loss of a large number of products.

Therefore, the various manufacturing stages have to be thoroughly monitored to avoid undue waste of man power, tool operation time and raw materials. Ideally, the effect of each individual process step on each substrate would be detected by measurement and the substrate under consideration would be released for further processing only if the required specifications were met. A corresponding process control, however, is not practical, since measuring the effects of certain processes may require relatively long measurement times, frequently ex situ, or may even necessitate the destruction of the sample. Moreover, immense effort, in terms of time and equipment, would have to be made on the metrology side to provide the required measurement results. Additionally, utilization of the process tool would be minimized since the tool would be released only after the provision of the measurement result and its assessment.

The introduction of statistical methods, also referred to as statistical process control (SPC), for adjusting process parameters significantly relaxes the above problem and allows a moderate utilization of the process tools while attaining a relatively high product yield. Statistical process control is based on the monitoring of the process output to thereby identify an out-of-control situation, wherein a causality relationship is established to an external disturbance. After occurrence of an out-of-control situation, usually operator interaction is required to manipulate a process parameter to return to an in-control situation, wherein the causality relationship may be helpful in selecting an appropriate control action. Nevertheless, in total, a large number of dummy substrates or pilot substrates may be necessary to adjust process parameters of respective process tools, wherein tolerable parameter drifts during the process have to be taken into consideration when designing a process sequence, since such parameter drifts may remain undetected over a long time period or may not efficiently be compensated for by SPC techniques.

Recently, a process control strategy has been introduced and is continuously improved allowing a high degree of process control, desirably on a run-to-run basis, with a moderate amount of measurement data. In this control strategy, the so-called advanced process control (APC), a model of a process or of a group of interrelated processes, is established and implemented in an appropriately configured process controller. The process controller also receives information including pre-process measurement data and/or post-process measurement data, as well as information related to, for instance, the substrate history, such as type of process or processes, the product type, the process tool or process tools, in which the products are to be processed or have been processed in previous steps, the process recipe to be used, i.e., a set of required sub-steps for the process or processes under consideration, wherein possibly fixed process parameters and variable process parameters may be contained, and the like. From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration.

Thus, the APC controller may have a predictive behavior, which is typically referred to as model predictive control (MPC). Model predictive control schemes, although originally used for real-time control of continuous processes, may also be used for run-to-run control situations in that the continuous time parameter is replaced by a discrete process run index, wherein the controller is now configured to respond to substantially continuous disturbances, also referred to process drifts, and to substantially step-wise disturbances, which may be considered as process shifts. Thus, run-to-run control may provide the potential of compensating for predictable, that is, deterministic, disturbances, such as process shifts and drifts.

One important application of run-to-run control is the monitoring of lithography processes, as the lithography process is one of the most critical processes during the fabrication of semiconductor devices. Moreover, the lithography process may typically provide enhanced control capabilities as the process is typically performed step-wise for each individual substrate, that is, a plurality of individual imaging steps are usually performed for each substrate, thereby enabling individual control of each single step. Consequently, across-wafer uniformity may be controlled by appropriately adapting process parameters of the individual imaging steps. In addition, the lithography has a somewhat unique position in that the process output of the lithography process may be assessed and the lithography process may be repeated when specific process margins are not achieved. On the other hand, lithography is a highly cost-intensive process and undue reprocessing of out-of-control substrates may substantially contribute to overall production costs. One problem, in addition to the appropriate imaging of a mask pattern into a photoresist layer, is the overlay accuracy of lithography processes performed in different device layers. The formation of semiconductor devices and other microstructural features is frequently based on the formation of three-dimensional features by successively forming substantially two-dimensional layers, which have to be precisely aligned to each other so as to provide the final three-dimensional feature having the required characteristics. Consequently, in a lithography process, the image of the reticle used for the current device layer has to be precisely aligned with the previously formed layers. Thus, a plurality of overlay error parameters have been established to allow assessment of the overlay performance including any pre-alignment activities of the lithography tools.

FIGS. 1a and 1b schematically illustrate eight overlay error parameters that may typically be used as control variables in a run-to-run controller for substantially maintaining the overlay parameters on target. FIG. 1a schematically shows a substrate 150 having formed thereon a first pattern of features 151 and a second pattern of features 152 that has been formed by lithography, wherein inspection of the patterns 151 and 152 may allow establishment of numerical values of overlay error parameters, such as magnification, x-scale, y-scale, substrate rotation and orthogonality. Moreover, FIG. 1b schematically shows overlay error parameters related to a reticle rotation and translations in the x- and y-directions. Consequently, a corresponding exposure tool recipe may contain eight manipulated variables that correspond to the eight overlay error parameters specified above. Hereby, the manipulated variables may represent so-called controller inputs, that is, any process parameters of the lithography tool which may be adjusted by the controller so as to obtain specified values for the above-specified overlay error parameters or control variables, such as magnification, x-translation, orthogonality and the like. Frequently, the lithography tools are designed such that a linear model may be used to correlate the detected overlay error parameters or control variables to the respective manipulated variables.

Equation 1 illustrates a corresponding linear model, in which the process gain, i.e., the slope of the straight line represented by the linear model, is selected to 1, wherein $E_k$ represents one of the overlay error parameters, $C_k$ represents the associated manipulated variable and $I_k$ represents the intercept.

$$E_k = C_k + I_k \quad (1)$$

In order to calculate the optimal process input, i.e., the respective values for the manipulated variables $C_k$, it is typically assumed that the corresponding intercept $I_k$ is only constant in a local sense, since process drifts and shifts may occur over time due to tool aging and/or process disturbances. Thus, based on the above model and the non-constancy of the various intercepts $I_k$, appropriate values of the manipulated variables may be calculated on the basis of well-established controller schemes, thereby significantly reducing the effect of drifts and disturbances on the overlay error parameters $E_k$. In order to keep the alignment characteristics at substrate level substantially constant, any tool drifts are usually compensated for by calibration of set points of the manipulated variables by means of machine constants, which are verified during preventive maintenance on a regular basis. In this connection, it should be appreciated that the term "machine constants" does not necessarily mean that the "constants" are stable over time. Rather, the machine constants are affected by the tool drifts and the corresponding value drift is "monitored" by the preventive maintenance operations. For example, any reference positions for the x- and y-translations may represent machine constants based on which corresponding manipulated variables, such as a control signal for a corresponding x- and y-drive motor, may be adjusted. Consequently, any changes in the machine constants will directly result in a change of the tool state and thus will lead to an offset of the respective alignment parameter intercepts $I_k$. Depending on the variation of the corresponding machine constants revealed by a corresponding preventive maintenance activity, conventionally different control strategies may be performed. When a variation of the machine constant occurs in moderately little steps, it is assumed that the controller may react to these small "step disturbances" in an appropriate manner and no further activity is required. In addition or alternatively, the controller data produced so far may be discarded, i.e., the controller, at least for the specified process tool and the respective process recipe, may be reset, thereby requiring a new initialization at least for all controller data referring to the specified process tool and the corresponding process recipe, thereby necessitating the processing of pilot substrates. Thus, irrespective of the control scheme used, a reduced controller performance may be obtained owing to the changes of machine constants, since the occurrence of step disturbances, introduced by the updated machine constants which directly affect the set point calibration and thus the controller performance, may result in declined controller performance immediately after the disturbance, while resetting of the controller may result in reduced throughput and compromised controller performance at an initial phase.

In view of the situation described above, there exists a need for an enhanced technique that enables an enhanced control strategy, wherein one or more of the problems identified above may be avoided or the effects thereof at least be significantly reduced.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to a technique that provides enhanced control efficiency for process tools that are operated on the basis of machine constants which have to be verified on a regular basis. For this purpose, the machine constants or any data related thereto may explicitly be included into a model predictive control strategy, thereby significantly enhancing controller performance after a "step disturbance" introduced by updated values of the machine constants.

According to one illustrative embodiment of the present invention, a method comprises determining a current value of a first control variable on the basis of a measurement result obtained from at least one substrate processed by a process tool to be controlled on the basis of one or more manipulated variables, wherein the one or more manipulated variables are defined on the basis of one or more machine constants of the process tool. The method further comprises determining an updated value of the manipulated variables by a model predictive control algorithm on the basis of the current value and a measured value of at least one of the machine constants. Finally, the process tool is operated on the basis of the updated values of the manipulated variables.

In accordance with another illustrative embodiment of the present invention, a method comprises performing a first run of a process in a process tool with a first substrate and obtaining a first measurement data from the first substrate. Moreover, the method comprises determining an updated value for at least one manipulated variable on the basis of the first measurement data and a model predictive control algorithm, wherein the model predictive control algorithm comprises a control law of the process and an observer, which operates on the first measurement data and second measurement data related to said at least one manipulated variable of the model predictive control algorithm. Finally, a second run of the process is performed on the basis of the updated value of the at least one manipulated variable.

According to yet another illustrative embodiment of the present invention, a controller is provided. The controller comprises a model predictive control section configured to receive first data related to a measurement of a previous process run of a process tool controlled by the controller. The model predictive control section is further configured to receive second data related to one or more machine constants of the process tool. The model predictive control section is further configured to operate on the first and second data to generate an updated value for at least one manipulated variable for controlling a subsequent process run of the process tool. Finally, the controller comprises a control output configured to provide an output signal representing the updated value.

BRIEF DESCRIPTION OF THE DRAWINGS

The invention may be understood by reference to the following description taken in conjunction with the accompanying drawings, in which like reference numerals identify like elements, and in which.

Figure 1A:
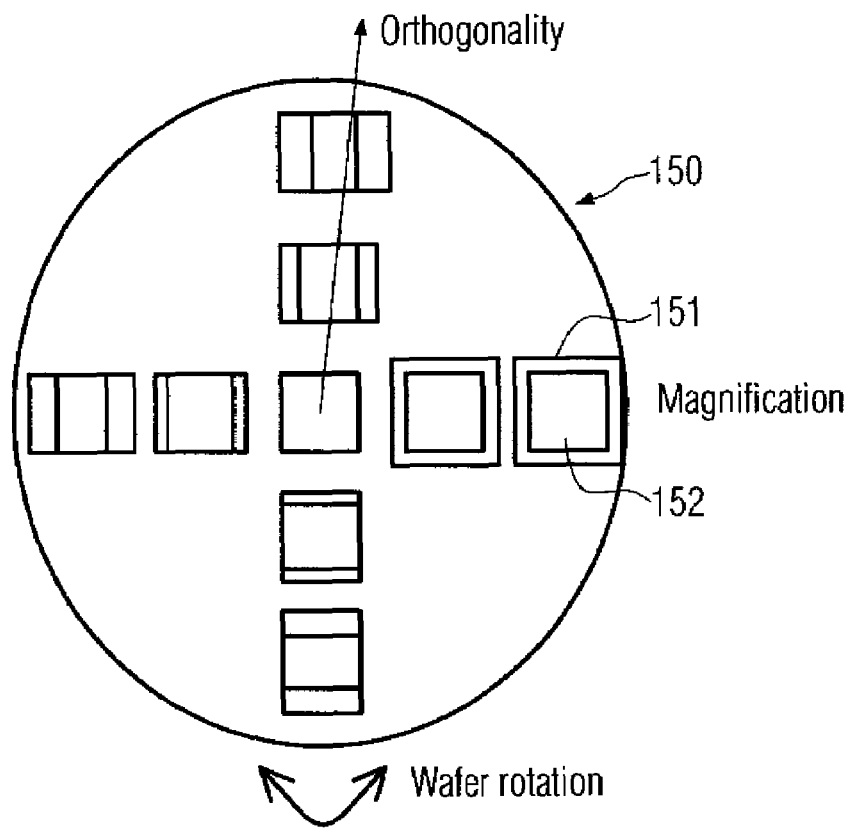
FIGS. 1a and 1b schematically illustrate a substrate having formed thereon appropriate patterns for identifying overlay error parameters.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention contemplates model predictive control strategies, in which the control state, i.e., the state of the various manipulated variables of a process tool, is calibrated, i.e., are defined on the basis of machine constants which have to be verified by measurement on a regular basis or any other appropriate time schedule to detect any drift of the machine constants within a reasonable time period. In this connection, a manipulated variable or a controlled variable is to be understood as a process parameter of a process recipe, the value of which may be adjusted to obtain a certain effect on one or more control variables, which may represent an output characteristic of the process or process sequence under consideration, wherein the output characteristic may be determined on the basis of measurements. Thus, the present invention provides a control strategy, which may provide enhanced control efficiency in that machine constants related to respective manipulated variables may explicitly be taken into consideration by the controller algorithm so that, contrary to conventional control strategies in model predictive controller schemes, otherwise hidden tool drifts may directly be incorporated into the algorithm, thereby significantly enhancing the controller performance, at least after the occurrence of a step disturbance introduced by an updated set of measurement data for the machine constants.

It should be appreciated that typically most of the manipulated variables depend on tool-specific constants, wherein, frequently, tool internal controllers provide the required precision or constancy between the machine constants and the manipulated variables, or wherein the machine constants are per se highly stable. For example, a flow rate, a chamber pressure, a substrate temperature, may represent manipulated variables of a specific process recipe, wherein a sufficient accuracy may be assumed for the correlation between respective "machine constants" and the manipulated variables, as the operation of corresponding valve elements, temperature and pressure sensors and associated PID (proportional, integral, differential) controllers may be assumed to be highly accurate so that the selection of a specific value for one of these manipulated variables by the controller will actually result in a corresponding flow rate, temperature or pressure without significant drift over time. On the other hand, other manipulated variables may be defined or calibrated on the basis of machine constants which may be subjected to significant drift over time and may therefore require verification in accordance with a certain time schedule so as to avoid undue drift between two subsequent verification measurements.

One prominent example for manipulated variables that are highly sensitive to the current values of the machine constants are manipulated variables related to overlay and alignment processes. For example, the position of a substrate holder in a photolithography tool may slightly vary even upon minute environmental influences or due to tool aging and the like, thereby possibly significantly affecting the actual value of a manipulated variable that is based on the position of the substrate holder, for instance in the form of a reference position, and the like, wherein these significant drifts may not be compensated by any internal "compensation mechanisms." In conventional model predictive control strategies such tool drifts, which are per se invisible until a responding machine constant verification is performed, are compensated for in an indirect manner in that a change of the machine constants is considered as a step disturbance of the lithography process, thereby possibly requiring a re-initialization of the controller, if the step disturbance is considered too high.

Figure 2:
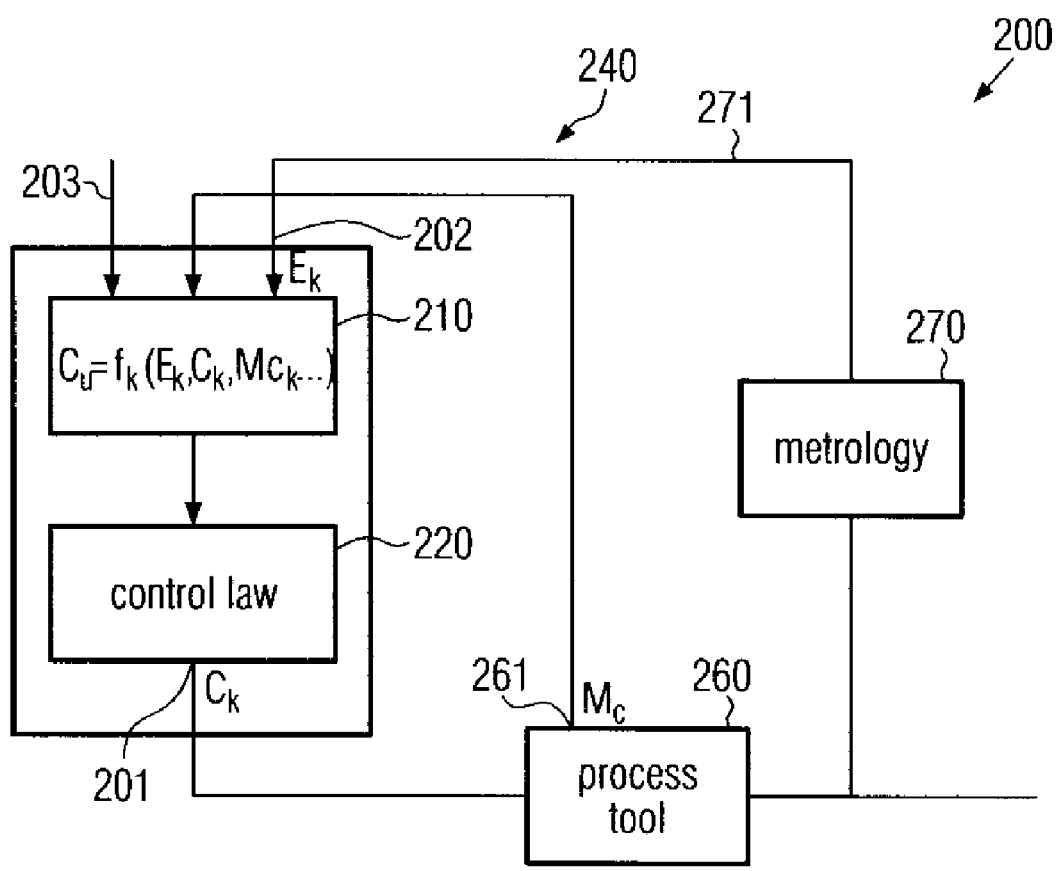
FIG. 2 schematically shows a block diagram of a control scheme for operating a process tool on the basis of a model predictive controller in accordance with illustrative embodiments of the present invention.
Figure 3A:
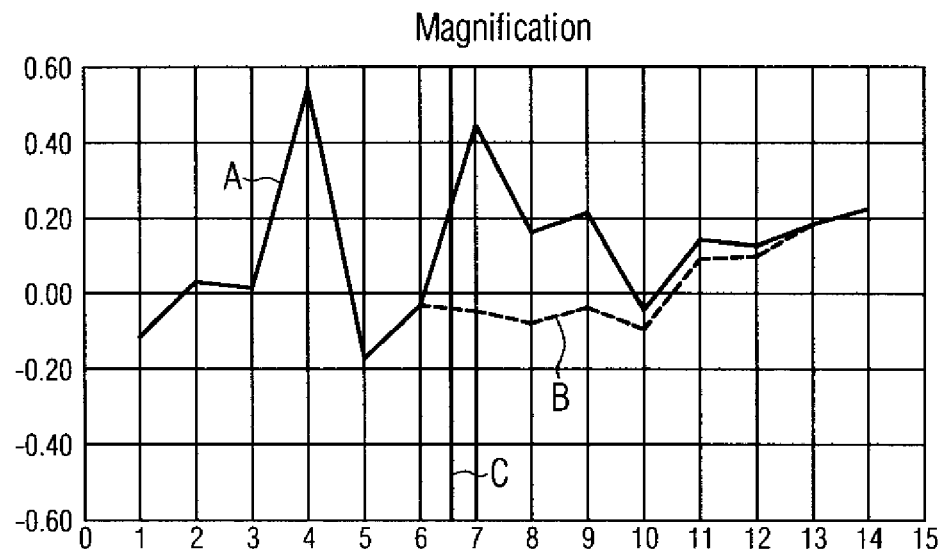
FIGS. 3a and 3b schematically represent simulation results, which compare the model predictive control performance based on explicit reference to machine constants according to the present invention, with conventional model predictive control strategies for two different overlay error parameters.
Figure 3B:
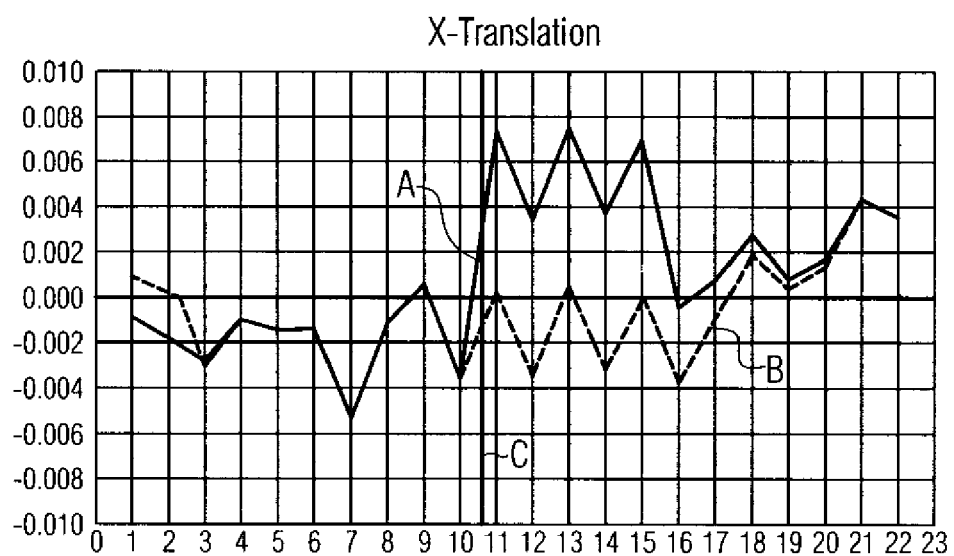

Contrary thereto, in the present invention, the machine constants or any variables related thereto are explicitly taken into consideration so that the controller is "aware" of the effect a machine constant drift may have on the manipulated variables. It should be appreciated that the present invention is particularly advantageous with respect to overlay control, as here a significant drift of machine constants is typically encountered. However, the present invention may also readily be applied to the control of any processes performed on process tools, in which the control state, i.e., the manipulated variables, are calibrated on the basis of machine constants, which have an effect and, in particular embodiments, a linear effect on the control state. It should be noted that the term "overlay control" may include the control of any pre-alignment processes performed in the lithography tool prior to the fine-tuned alignment prior to the actual imaging process. With reference to FIGS. 2 and 3a-3b, further illustrative embodiments of the present invention will now be described in more detail.

Figure 1B:
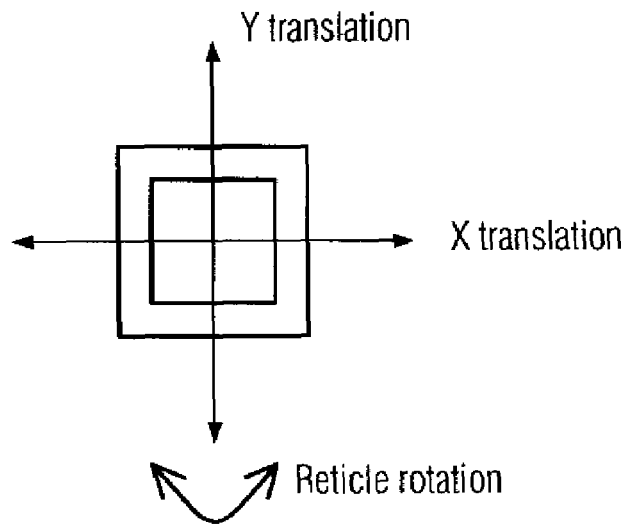

FIG. 2 schematically depicts a manufacturing environment 240 which may represent a portion of a semiconductor facility. The environment 240 may comprise a process tool 260, which may include a plurality of machine constants MC261, on the basis of which respective tool parameters may be calibrated. Hereafter, the tool parameters will be considered equivalent to manipulated variables, although in reality these two items may differ from each other, however, in a strongly dependent manner. For instance, a tool parameter may be represented by the distance with which a substrate holder may have to be moved in a specified direction, whereas the manipulated variable associated therewith may be represented by the power supplied to a corresponding electric motor or a piezoelectric element driving the substrate holder along the specified direction. If the correspondence between the corresponding manipulated variable and the tool parameter is sufficiently "strong," that is, substantially no deviation in their mutual relationship is to be expected, then both items may be considered as equivalent. In other cases, when this correlation between the two items may significantly drift over time due to any predictable or unpredictable factors, the corresponding tool parameter may be identified as a corresponding machine constant MC261 so as to establish the correspondence between a manipulated variable and a respective process parameter. For example, in the former case, the distance in the specified direction may be considered as the corresponding manipulated variable and may be equivalent to specifying the power to be supplied to an electric motor, if the same power substantially provides the same distance over time. In the latter case, the manipulated variable, i.e., the power supplied to the drive unit, may be calibrated on the basis of a corresponding machine constant 261, when a significant drift of the correlation between the manipulated variable and a process tool parameter is to be expected, as the same power may not result in the same distance. In the following, it is referred to manipulated variables, which may be considered equivalent to tool parameters in the above-described sense, wherein at least some of the manipulated variables and thus the tool parameters have to be calibrated on the basis of the one or more machine constants 261. In one particular embodiment, the process tool 260 may represent a lithography tool, wherein the one or more machine constants 261 represent parameters that are correlated with tool parameters or manipulated variables, each of which determines a respective one of the overlay and pre-alignment error parameters as have been described with reference to FIGS. 1a and 1b.

The environment 240 further comprises a metrology tool 270 that is configured to provide measurement data on the process output of the tool 260. For example, the metrology tool 270 may represent an inspection tool configured to provide measurement data referring to one or more of the overlay error parameters specified above, if the process tool 260 is to represent a lithography tool, the pre-alignment and overlay behavior of which is to be controlled. The environment 240 further comprises a controller 200 that is configured to provide a value for at least one manipulated variable $C_K$ 201, wherein the at least one manipulated variable 201 is provided to the process tool 260 so as to maintain the tool 260 near a target value that corresponds to the manipulated variable 201. Moreover, the controller 200 is configured to receive from the metrology tool 270 first measurement data 271, which may be used in the controller 200 in the form of at least one control variable $E_K$ 202. It is to be noted that the at least one control variable $E_K$ 202 may be considered as the output produced by the process tool 260 and detected by the metrology tool 270 in the form of the measurement data 271. The controller 200 is designed to produce the one or more manipulated variables $C_k$ 201 on the basis of the at least one control variable $E_K$ 202, i.e., on the basis of the measurement data 271, so as to maintain the process output of the tool 260 near a respective target value $T_k$ for the at least one control variable $E_K$ 202. In some illustrative embodiments, the controller 200 may further be configured to receive additional process related information 203, which may include measurement data from any process tools downstream and/or upstream of the process tool 260 so as to enhance the control capability of the controller 200 by further feedback loops and/or feed forward loops. In particular embodiments, the additional information 203 may be provided by a supervising control system, such as a manufacturing execution system which may coordinate the process flow in the environment 240.

The controller 200 is configured as a model predictive controller, which is designed to estimate the future state of the control variable $E_K$ 202 on the basis of the values of the previous control variables $E_K$ 202, i.e., on the basis of the measurement data 271, on the basis of the current control status, i.e., the values of the manipulated variables $C_k$ 201 and, contrary to conventional model predictive controller designs, explicitly on the basis of the machine constants 261 or any parameters representing the same. From the estimated value of the control variable, appropriate updated values of the manipulated variables $C_k$ 201 may then be determined on the basis of a predefined control law so as to maintain the process tool 260 within specified process margins. For this purpose, the appropriately selected target values $T_k$ may be determined in advance, or may be dynamically updated, so as to quantitatively specify the process goal of the tool 260. In one illustrative embodiment, the model predictive control algorithm implemented in the controller 200 may be a linear model predictive control strategy, which means that a linear relationship is assumed between the control variables $E_K$ 202 and the manipulated variables $C_k$ 201. For example, if the process tool 260 may represent a photolithography tool and the controller 200 is designed so as to control the pre-alignment and overlay behavior of the tool 260, a basic linear relationship such as given above in the form of Equation 1 may be used, wherein additionally the machine constants 261 are explicitly introduced into the equation. In one illustrative embodiment, a linear dependency between the intercept $I_k$ and the machine constants 261 may be assumed. For example, as shown in Equation 2, a linear model may be assumed, wherein the machine constants 261 result in a specified offset to the intercepts $I_K$:

$$E_k = C_k + I_k - Mc_k \qquad (2)$$

It should be appreciated, however, that other process models may be used, as long as the machine constants 261 are explicitly referred to in the process model. For instance, a process gain, i.e., the factor associated with the manipulated variables $C_k$, may be introduced in accordance with tool characteristics. Similarly, a corresponding weighting factor may be used in combination with the machine constants 261. Consequently, a linear process model, such as presented by Equation 2, may be highly advantageous in combination with process tools or process tool systems that are typically calibrated by modifying the machine constants 261, which have a substantially linear offset effect on the control state, i.e., on the manipulated variables $C_k$.

The controller 200 may be considered as having implemented therein an observer 210, which "observes" the control variables $E_K$ 202, or which may observe an otherwise non-visible controller state which may be advantageous when a plurality of different process recipes are to be processed in the tool 260. Moreover, the controller 200 may also have implemented therein a control law 220, which may be represented by any algorithm that is configured to determine, based on the process state or the control variable observed by the observer 210, appropriate values for the manipulated variables $C_k$ so as to achieve the desired process goal. For example, if the controller 200 is to represent a single input single output (SISO) system, i.e., a single manipulated variable C is to be determined on the basis of a single control variable E and a single machine constant 261, the control law 220 may simply be represented by an inversion of the model, such as the linear model shown in Equation 2, wherein the control variable E is replaced by the corresponding target value T and the equation is solved so as to obtain the manipulated variable C. In other embodiments, the controller 200 may be designed so as to operate on a plurality of manipulated variables $C_k$, a plurality of machine constants 261 $MC_K$ and a plurality of control variables $E_k$.

As previously pointed out, the controller 200 may be provided in the form of a run-to-run controller so that the observer 210 is configured to determine the future control variable or control state on the basis of the measurement data 271 of one or more previous process runs. Depending on the delay of the measurement data 271 with respect to the operation of the tool 260, the controller 200 may predict appropriate values of the manipulated variables for more than one process run ahead of the process run, which is defined by the currently used measurement data 271. In one illustrative embodiment, the observer 210 of the controller 200 is designed as an exponentially weighted moving average filter (EWMA), which may therefore provide an updated value of the control state for the next process run on the basis of the process history of the process tool 260, wherein the process history is represented by the measurement data 271 of at least the preceding process run and of the currently valid values of the machine constants 261 and possibly by the additional information 203. Thus, when assuming the linear process model as is for instance given by Equation 2, the observer 210 may provide the intercepts $I_k$ (n+1) for the next run n+1, when n represents the last process run performed by the tool 260, on the basis of the following Equation 3:

$$I_k(n+1) = \underset{i=0}{\overset{n}{EWMA}}[E_k(i) - C_k(i) + Mc_k(n+1)] - Mc_k(n+1) \qquad (3)$$

Hereby, the notion $$\underset{i=0}{\overset{n}{E W M A}}$$

means the moving average of the expression in the brackets according to the exponential weighting from the very first process run to the latest process run having the index n. Thus, the observer 210 expresses the intercept $I_k$ of the next run (n+1) and thus the status of the process tool 260, which may be the overlay status, when the tool 260 represents a photolithography tool, wherein it may be assumed that the machine constants for the run (n+1) are the same as for the run n. Consequently, based on the future intercepts $I_k$ (n+1), the control law 220 may calculate the values for the manipulated variables for the next run, indicated as $C_K$ (n+1). This may qualitatively be expressed by Equation 4, wherein the notion LMPC indicates an appropriate control law in accordance with a linear model predictive control algorithm. Hereby, $T_k$ represents the target value for the control variable $E_K$, and Q, R, S represent appropriately selected weighting matrices of the LMPC algorithm:

$$C_k(n+1) = LMPC(I_k(n+1), C_k(n) + Mc_k(n) - Mc_k(n+1), T_k, Q_k, R_k, S_k) \qquad (4)$$

Equations 5, 6 and 7 illustrate a model predictive control formulation in accordance with one illustrative embodiment, wherein for convenience the index k has been omitted and the corresponding entities are to be considered as vectors.

$$\min_{c(n+1)} J = (T - E(n+1))^T Q(T - E(n+1)) + \qquad (5)$$
$$c^T(n+1)Rc(n+1) + \Delta c(n+1)^T S \Delta c(n+1)$$

$$E(n+1) = c(n+1) + I(n+1) \qquad (6)$$

$$c(n+1) = (Q+R+S)^{-1}(Sc(n) + Q(T-I(n))) \qquad (7)$$

That is, C(n+1) presents the vector formed by the plurality of $C_k$(n+1) for all parameters k relevant for operating the process tool 260. Hereby, the linear model of Equation 2 is used. Thus, the control law 220 having the form of Equations 5-7 is a general controller model and allows obtaining an optimal balance between missing the process target values $T_k$, the absolute controller input, i.e., the manipulated variables $C_k$, and the change in the controller input from the previous process run. Moreover, by appropriately selecting the matrices Q, R, S, the controller behavior may be adapted to specific goals, such as minimum deviation from the target values and the like, as is frequently a desired process goal. The updated manipulated variables $C_k$ (n+1) as obtained from Equation 4 may, in one illustrative embodiment, be subjected to further constraints so as to enhance controller stability, thereby significantly reducing oscillations in control actions, when the process tool 260 is near target in its output, i.e., in the control variable $E_k$. For instance, in one embodiment, a deadband may be placed around the control variable $E_k$, which may be advantageous for pre-alignment and overlay control, since any variability in overlay performance is translated into corresponding alignment variations at all subsequent layers. Thus, the possible loss of accuracy due to a possible permanent small error with respect to the target value $T_k$ may be outweighed by the gain of stability in the process achieved by the additional deadband. Moreover, controller response may be accelerated as any errors in the vicinity of the target may be ignored. In a further illustrative embodiment, in addition or alternatively to the deadband filter, a limiter filter may be used, which may specify a certain controller behavior upon occurrence of significant deviation of the control variable, i.e., the measurement data 271. Thus, extremely large oscillations of the controller 200 may be avoided, since the corresponding control activity may be restricted, for instance by admitting only a change of the manipulated variable within a specified range.

Equation 8 qualitatively represents the above-specified deadband filter and/or limiter, indicated as a function $F_k$ so as to obtain modified manipulated variable $C'_k(n+1)$ for the subsequent process run.

$$C'_k(n+1) = F_k(C_k(n+1), C_k(n) + Mc_k(n) - Mc_k(n+1)) \quad (8)$$

FIGS. 3a and 3b schematically illustrate results of simulation calculations for a control situation, in which the tool 260 represents a photolithography tool and the controller In FIG. 3a, the magnification is used as the control variable $E_k$ (FIG. 1a) wherein curve A (solid line) represents the performance of a conventional controller, i.e., of a controller that does not explicitly operate on the machine constants $MC_K$ 261, whereas curve B represents the behavior of the controller 200, as described above. The horizontal axis represents the time, i.e., the number of process runs, after which a measurement value of the control variable "magnification" is obtained. Moreover, as indicated, between runs 6 and 7, a step disturbance is introduced owing to a new reading of the respective machine constant 261 related to that manipulated variable $C_k$ that determines the magnification, wherein a change of approximately 30 percent is assumed and wherein the new machine constant reading is provided to the observer 210. As is evident from FIG. 3a, the conventional controller causes a significant deviation from the target value, i.e., value 0.0, immediately after the occurrence of the "step disturbance," represented by curve C, while the controller 200 substantially stays on target.

Similarly, FIG. 3b represents a graph for a conventional controller and the controller 200 when the x-translation is considered as the control variable $E_k$. Again, a new reading of the corresponding machine constant 261, indicated by line C, is supplied to the controller, in this example between the runs 10 and 11, thereby indicating a significant drift of the respective machine constant of approximately 50%, which may have been revealed by a preventive maintenance action. Also, in this case, the conventional controller represented by curve A shows a significant deviation from the target value after the occurrence of the step disturbance represented by the newly introduced measurement data, whereas the controller 200 does exhibit a substantially "smooth" controller behavior after the step disturbance C. Consequently, the overall controller performance may significantly be enhanced compared to conventional strategies.

As a result, the present invention provides a technique for enhanced APC run-to-run strategies for process tools, in which manipulated variables are calibrated or adjusted on the basis of machine constants that may exhibit a significant drift over time. For this purpose, the machine constants are explicitly taken into consideration in the controller scheme, thereby significantly smoothing the controller performance when new measurement readings of the machine constants are obtained, even in the case of significant changes of the machine constants. In conventional controller strategies, in which the new machine readings may not be "noticed" at all or may lead to a recalibration and thus an indirect "step disturbance," in this case frequently even a new initialization is required, thereby discarding respective controller data and possibly requiring processing of pilot substrates for the specific process recipe and products under consideration. Since in the present invention the machine constants are directly present in the controller algorithm, the new machine readings may be considered as additional measurement data or control variables, thereby smoothing the controller output and enabling the controller to stay more on target.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    determining a current value of a first control variable on the basis of a measurement result obtained from at least one substrate processed by a process tool to be controlled on the basis of one or more manipulated variables, said one or more manipulated variables being defined on the basis of one or more machine constants of said process tool;
    determining an updated value of said one or more manipulated variables by a model predictive control algorithm on the basis of said current value of the first control variable and a measured value of at least one of said machine constants; and
    operating said process tool on the basis of said updated value of said one or more manipulated variables.

2. The method of claim 1, further comprising obtaining an updated measured value for said at least one machine constant and determining said updated value of said one or more manipulated variables on the basis of said updated measured value of said at least one machine constant.

3. The method of claim 1, wherein said model predictive control algorithm is based on a linear relationship between said first control variable and said one or more manipulated variables.

4. The method of claim 3, wherein a linear relationship between said at least one machine constant and a correlated manipulated variable is used for determining said updated value of said one or more manipulated variables.

5. The method of claim 1, further comprising:
    determining a current value of a second control variable on the basis of a second measurement result obtained from at least one substrate processed by said process tool to be controlled on the basis of said one or more manipulated variables;

determining an updated value for a second one of said one or more manipulated variables by said model predictive control algorithm on the basis of said current value of said second control variable and a measured value of at least one of said machine constants; and operating said process tool on the basis of said updated values of said manipulated variables.

6. The method of claim 5, wherein said model predictive control algorithm is based on a linear relationship between said second control variable and said one or more manipulated variables.

7. The method of claim 6, wherein a linear relationship between said one or more machine constants and a correlated manipulated variable is used for determining said updated value of said second one of the one or more manipulated variables.

8. The method of claim 1, wherein said process tool comprises a photolithography tool.

9. The method of claim 8, wherein said first control variable is an alignment related variable.

10. A method, comprising:

performing a first run of a process in a process tool with a first substrate;

obtaining a first measurement data for said first substrate, said first measurement data indicating at least one control variable of said process;

determining an updated value for at least one or more manipulated variables on the basis of said first measurement data and a model predictive control algorithm, said model predictive control algorithm comprising a control law of said process and an observer operating on said first measurement data and second measurement data related to said one or more manipulated variables of said model predictive control algorithm, wherein said second measurement data are obtained as measurement readings of machine constants of said process tool; and performing a second run of said process on the basis of said updated value of said one or more manipulated variables.

11. The method of claim 10, wherein said observer is based on a linear relationship between said at least one control variable and said one or more manipulated variables.

12. The method of claim 11, wherein said observer comprises an exponentially weighted moving average filter.

13. The method of claim 10, wherein said observer uses a linear relationship between said machine constants and said one or more manipulated variables.

14. The method of claim 10, wherein said control law is configured to operate on a plurality of control variables and a plurality of manipulated variables.

15. The method of claim 10, wherein said process tool comprises a photolithography tool.

16. The method of claim 15, wherein said one or more manipulated variables represent alignment related process parameters of said photolithography tool.

17. A controller, comprising a model predictive control section configured to receive first data related to a measurement of a previous process run of a process tool controlled by said controller and to receive second data related to one or more measured values of one or more machine constants of said process tool, said model predictive control section being further configured to operate on said first and second data to generate an updated value for at least one manipulated variable for controlling a subsequent process run of said process tool; and a control output configured to provide an output signal representing said updated value.

18. The controller of claim 17, wherein said model predictive control section comprises a linear observer algorithm explicitly operating on said one or more machine constants.

19. The controller of claim 18, wherein said at least one manipulated variable represents an alignment related process parameter of a photolithography tool.

* * * * *